(12) United States Patent
Islam et al.

(10) Patent No.: US 10,393,976 B2
(45) Date of Patent: Aug. 27, 2019

(54) DEVICE FOR DISTRIBUTING HYBRID CABLE AND TRANSITIONING FROM TRUNK CABLE TO JUMPER CABLE WITH OVERVOLTAGE PROTECTION

(71) Applicant: CommScope Technologies LLC, Hickory, NC (US)

(72) Inventors: Nahid Islam, Westmont, IL (US); John Hanley, Orland Park, IL (US)

(73) Assignee: CommScope Technologies LLC, Hickory, NC (US)

( * ) Notice: Subject to any disclaimer, the term of this patent is extended or adjusted under 35 U.S.C. 154(b) by 312 days.

(21) Appl. No.: 15/347,838

(22) Filed: Nov. 10, 2016

(65) Prior Publication Data

US 2017/0141563 A1 May 18, 2017

Related U.S. Application Data

(60) Provisional application No. 62/256,318, filed on Nov. 17, 2015.

(51) Int. Cl.
  *G02B 6/44* (2006.01)
  *G02B 6/38* (2006.01)
  *H01H 83/10* (2006.01)

(52) U.S. Cl.
  CPC ......... *G02B 6/4416* (2013.01); *G02B 6/3817* (2013.01); *G02B 6/4471* (2013.01); *H01H 83/10* (2013.01)

(58) Field of Classification Search
  CPC .......... H02H 3/20; H01H 71/08; H01H 83/10; H01B 9/005; G02B 6/3817; G02B 6/3897; G02B 6/4416; G02B 6/4446; G02B 6/4471
  USPC ........................................................ 361/91.1
  See application file for complete search history.

(56) References Cited

U.S. PATENT DOCUMENTS

| | | | | |
|---|---|---|---|---|
| 4,309,748 A * | 1/1982 | Forro | ................... | H02M 3/156 363/65 |
| 4,872,092 A * | 10/1989 | Lush | ................... | H01R 9/2625 361/823 |
| 2013/0084050 A1* | 4/2013 | Vastmans | ............... | H02G 3/081 385/135 |
| 2013/0108227 A1* | 5/2013 | Conner | ................ | G02B 6/4471 385/101 |
| 2014/0055898 A1* | 2/2014 | Kostakis | .................. | H02H 3/20 361/91.5 |
| 2015/0109710 A1* | 4/2015 | Politis | .................. | H02G 15/113 361/119 |

* cited by examiner

*Primary Examiner* — Kevin J Comber
(74) *Attorney, Agent, or Firm* — Myers Bigel, P.A.

(57) ABSTRACT

A transition assembly for interconnecting a hybrid trunk cable and electronic equipment includes: an enclosure having first and second ends, first and second side walls, and a cavity; a hybrid trunk cable comprising first and second sets of pluralities of power conductors and a plurality of optical fibers, wherein the first and second sets of power conductors enter the enclosure at the first end; first and second sets of pluralities of connectors mounted to at least one of the first and second side walls; and an overvoltage protection module (OVP module).

19 Claims, 11 Drawing Sheets

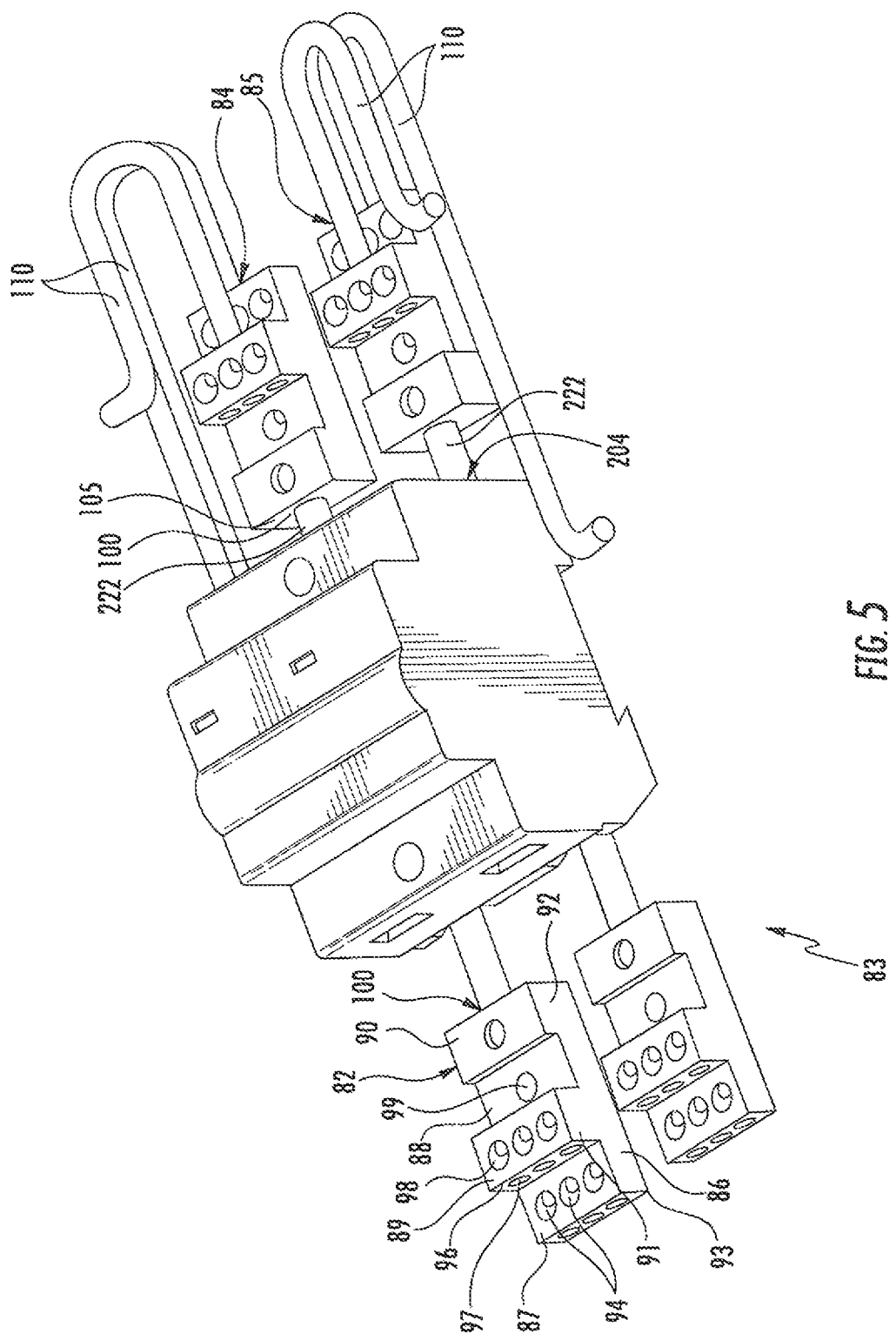

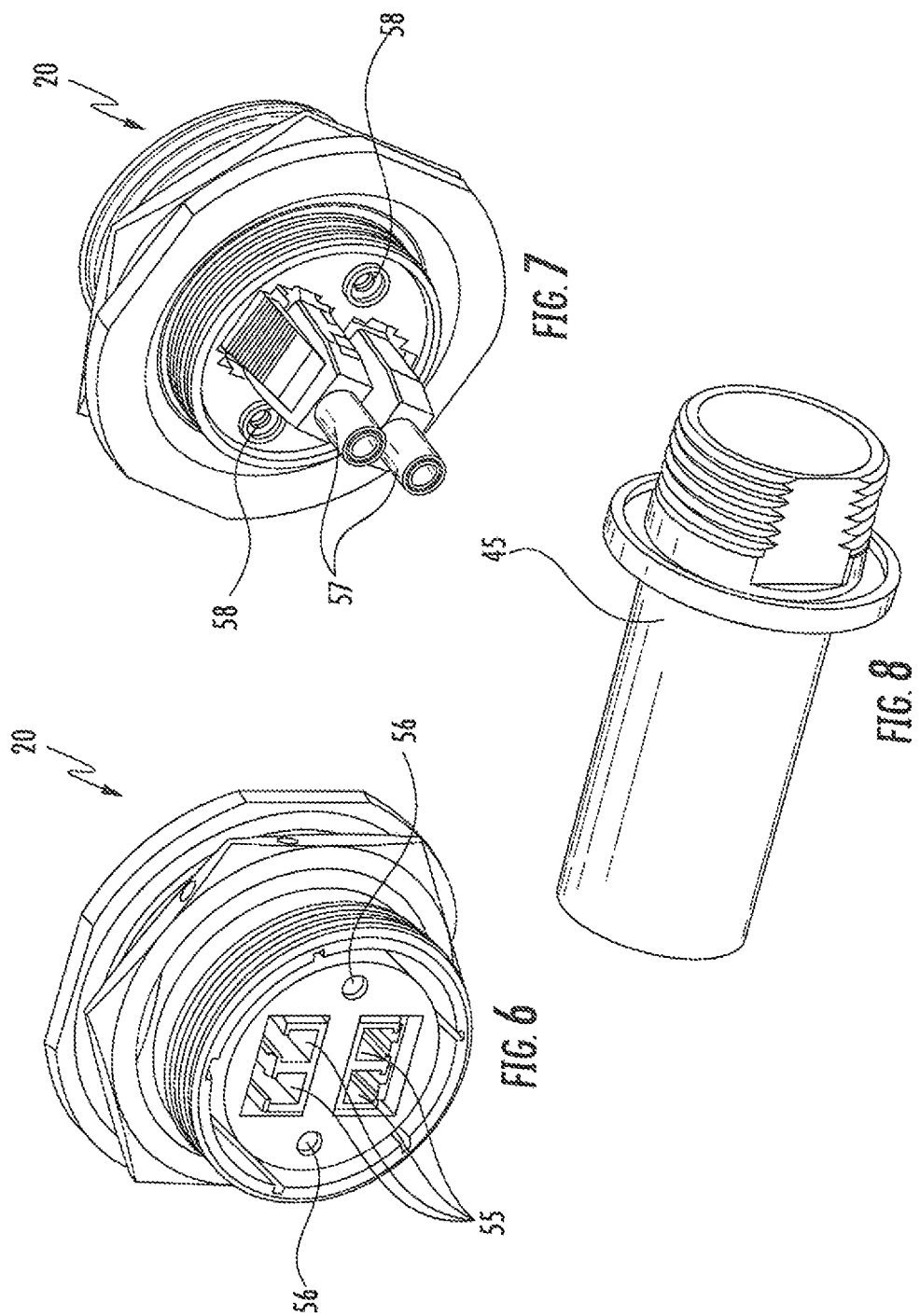

DEVICE FOR DISTRIBUTING HYBRID CABLE AND TRANSITIONING FROM TRUNK CABLE TO JUMPER CABLE WITH OVERVOLTAGE PROTECTION

RELATED APPLICATION

The present application claims priority from and the benefit of U.S. Provisional Patent Application No. 62/256,318, filed Nov. 17, 2015, the disclosure of which is hereby incorporated herein in its entirety.

FIELD OF THE INVENTION

The present invention relates generally to power and signal distribution, and more particularly to distribution from hybrid cables.

BACKGROUND

Latest developments in technology for delivering power and data in wireless infrastructure use hybrid cables, wherein the term "hybrid cable" is intended to mean a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RE cable. However, in order to use a single hybrid trunk cable, at some point the trunk cable must transition to jumper cables or cords. Typically, these are distributed inside an enclosure that transitions the trunk conductor gauge to the jumper conductor gauge and connects the optical fibers in the trunk to the optical fibers in the jumper cables.

Currently, transitions are achieved by making connections inside the enclosure, requiring it to be opened, cables to be fed/mated to the enclosure, and power and fiber connections to be made, all in the field (e.g., on the top of antenna tower sites near a remote radio unit (RRU)). This practice can create many issues for installers, including time, safety, connection errors (such as loose power connections and/or poor fiber cleaning), and more opportunity for connector damage.

In addition, at some sites it is desirable to provide overvoltage protection (OVP) for the RRU. OVP is usually supplied via a separate mounted enclosure that is connected to the power conductors of a hybrid cable. Jumper cords are then connected from the mounted enclosure to RRUs. These additional connection add time and expense to the interconnection process. It may be desirable to provide additional configurations for providing OVP at the top of an antenna tower.

SUMMARY OF THE INVENTION

As a first aspect, embodiments of the invention are directed to a transition assembly for interconnecting a hybrid trunk cable and electronic equipment. The transition assembly comprises: an enclosure having first and second ends, first and second side walls, and a cavity; a hybrid trunk cable comprising first and second sets of pluralities of power conductors and a plurality of optical fibers, wherein the first and second sets of power conductors enter the enclosure at the first end; a plurality of connectors mounted to at least one of the first and second side walls; and an overvoltage protection module (OVP module). The OVP module comprises: an overvoltage, unit mounted in the enclosure and configured to create an open electrical circuit when experiencing a voltage higher than a predetermined threshold; a first contact mounted in the enclosure and connected with the first set of power conductors; a second contact mounted in the enclosure in electrical isolation from the first contact, the second, contact connected, with the second set of power conductors; a first OVP conductor connected between the first contact and the overvoltage unit; a second OVP conductor connected between the second contact and the overvoltage unit; a third contact mounted in the enclosure and connected with the connectors; a fourth contact mounted in the enclosure in electrical isolation from the third contact, the fourth contact connected with the connectors; a third OVP conductor connected between the overvoltage unit and the third contact; and a fourth OVP conductor connected between the overvoltage unit and the fourth contact.

As a second aspect, embodiments of the invention are directed to a transition assembly for interconnecting a hybrid trunk cable and electronic equipment, comprising: an enclosure having first and second ends, first and second side walls, and a cavity; a hybrid trunk cable comprising first and second sets of pluralities of power conductors and a plurality of optical fibers, wherein the first and second sets of power conductors enter the enclosure at the first end; first and second sets of pluralities of connectors, mounted to at least one of the first and second side walls; and an overvoltage protection module (OVP module). The OVP module comprises: an overvoltage unit mounted in the enclosure and configured to create an open electrical circuit when experiencing a voltage higher than a predetermined threshold; a first contact mounted in the enclosure and connected with the first set of power conductors; a second contact mounted in the enclosure in electrical isolation from the first contact, the second contact connected with the second set of power conductors; a first OVP conductor connected between the first contact and the overvoltage unit; a second OVP conductor connected between the second contact and the overvoltage unit; a third, contact mounted in the mounting frame and connected with the connectors; a fourth contact mounted in the mounting frame in electrical isolation from the third contact, the fourth contact connected with the connectors; a third OVP conductor connected between the overvoltage unit and the third contact; a fourth OVP conductor connected between the overvoltage unit and the fourth contact; a first direct conductor extending between the first and third contacts; and a second direct conductor extending between the second and fourth contacts.

As a third aspect, embodiments of the invention are directed to a transition assembly for interconnecting a hybrid trunk cable and electronic equipment, comprising: an enclosure having first and second ends, first and second side walls, and a cavity; a hybrid trunk cable comprising first and second sets of pluralities of power conductors and a plurality of optical fibers, wherein the first and second sets of power conductors enter the enclosure at the first end; a plurality of connectors mounted to at least one of the first and second side walls; and an overvoltage protection module (OVP module) comprising: an overvoltage unit mounted in the enclosure and configured to create an open electrical circuit when experiencing a voltage higher than a predetermined threshold; a first contact mounted in the enclosure and connected, with the first set, of power conductors and with the connectors; a second contact mounted in the enclosure in electrical isolation from the first contact, the second contact connected with the second set of power conductors and with the connectors; a first OVP conductor connected between the first contact and the overvoltage unit; a second OVP conductor connected between the second contact and the overvoltage unit; a first direct conductor extending between the first and third contacts; and a second direct conductor extending between the second and fourth contacts.

BRIEF DESCRIPTION OF THE FIGURES

FIG. 5 is a top perspective view of an OVP module mounted in the transition assembly of FIG. 1.

FIGS. 6 and 7 are interior and exterior perspective views of hybrid connectors to be used with the transition assembly of FIG. 1.

FIG. 8 is a threaded cable sleeve for the transition assembly of FIG. 1.

DETAILED DESCRIPTION

Figure 1:
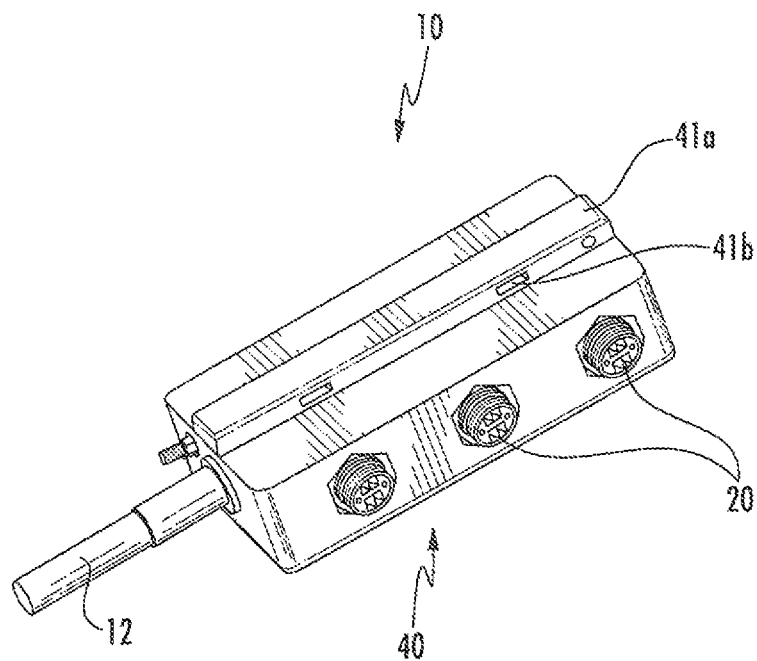
FIG. 1 is a bottom perspective view of a transition assembly according to embodiments of the present invention.
Figure 2:
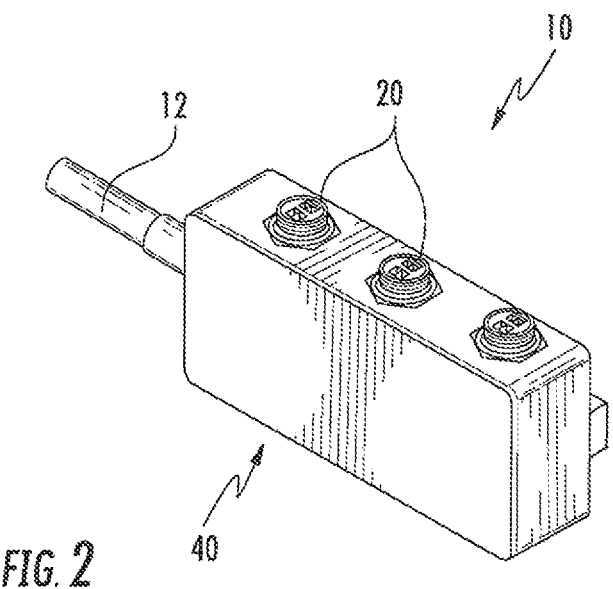
FIG. 2 is a side perspective view of the transition assembly of FIG. 1.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning, as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the drawings, a transition assembly, designated broadly at 10, is shown in FIGS. 1-10. The assembly 10 includes a hybrid trunk cable 12, a transition enclosure 40, multiple hybrid connectors 20, and an overprotection (OVP) module 70 (not shown in FIGS. 1 and 2). These components are discussed in greater detail below.

Referring to FIGS. 1, 2, 9 and 10, the transition enclosure 40 has a generally rectangular housing 47 with a floor 41, side walls 42, end walls 43, and a cover 44, although in other embodiments (such as that shown in FIG. 16 and discussed below) the housing 40 may take different configurations. The floor includes a ridge 41a with slots 41b that, can be used for mounting of the assembly 10 (for example, with hose clamps). The side walls 42 include mounting holes 51 for the hybrid connectors 20, and one end, wall 43 includes a hole 52 through which the hybrid trunk cable 12 is routed into the enclosure. The cover (FIG. 10) has a lip 53 that mates with the upper edges of the side walls 42 and the end walls 43; the presence of the cover 44 enables components within the enclosure 40 (such as the OVP unit 200) to be replaced in the field. The transition enclosure 40 is typically formed of polymer or polymer composite materials, but may comprise a number of suitable dielectric materials.

Referring now to FIGS. 1, 6 and 7, three hybrid connectors 20 are mounted on each side wall 42 in the mounting holes 51. The hybrid connectors 20 are configured to receive hybrid jumper rabies/cords with mating connectors. On its exterior sides (FIG. 6), each hybrid connector 20 has four fiber ports 55 and two power contacts 56. These align with fiber ports 57 and power contacts 58 located on the interior side of the connector 20 (FIG. 7). An exemplary hybrid connector 20 is an LC or multifiber MPO Fiber/Copper connector, available from Amphenol, which meets MIL-DTL-38999 specifications and can withstand severe environmental conditions.

The hybrid trunk cable 12 has a plurality of power conductors 13 (see FIGS. 3 and 11) and a plurality of optical fibers (see optical fibers 514 in FIG. 11) encased in a jacket 15. The hybrid trunk cable 12 enters the transition enclosure 40 through the hole 52 in one of the end walls 43. In the illustrated embodiment, the entry point of the hybrid trunk cable 12 includes a threaded sleeve 45 (see FIG. 8), but other entry components that provide a seal at the entry point, such as cable glands, gaskets, sealing compounds, and the like, may also be employed. The threaded sleeve 45 can be field installed inside the enclosure 40. Also, if the sleeve 45 is metallic, it can be connected to an armored cable and used as grounding.

Figure 3:
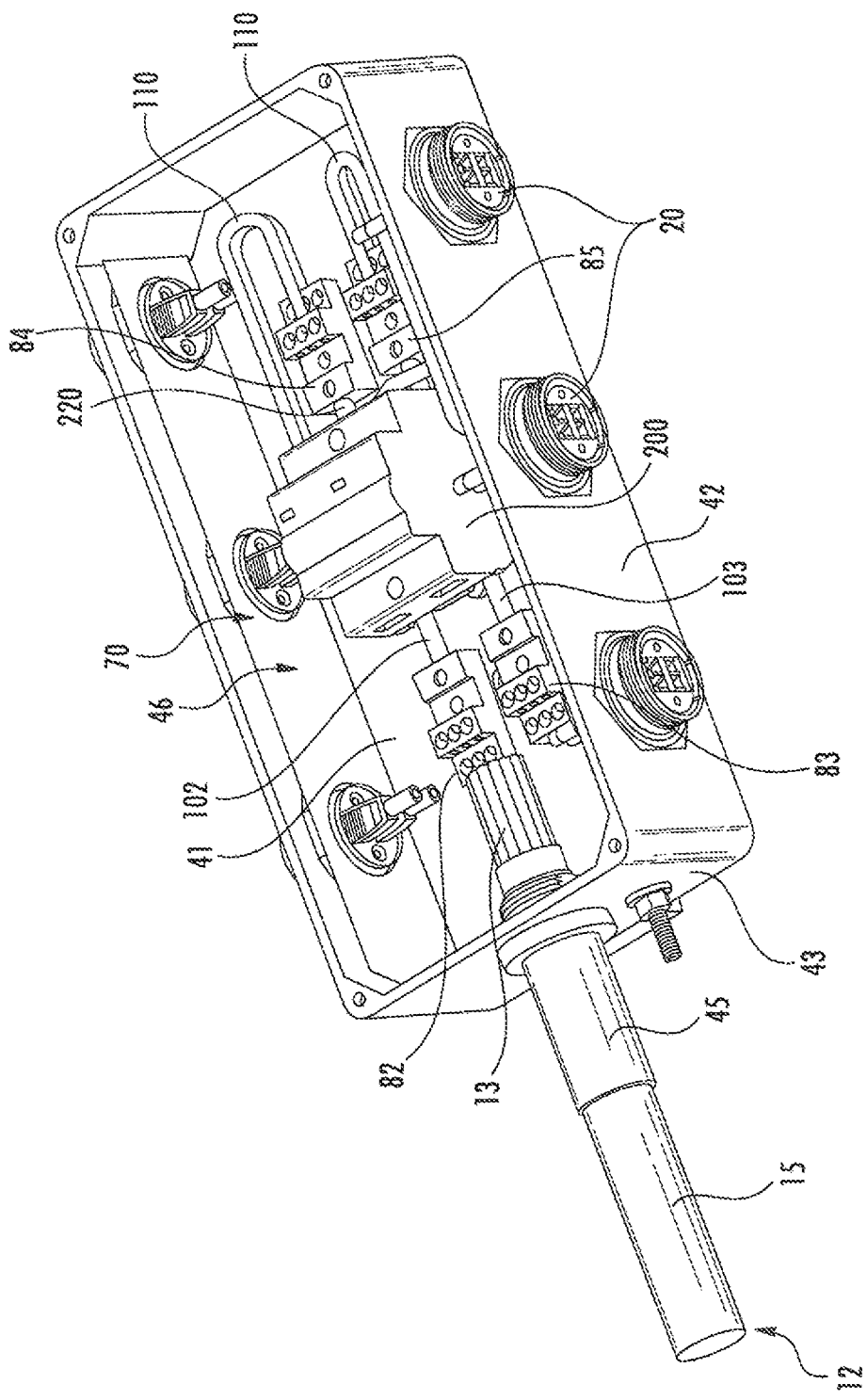
FIG. 3 is a top perspective view of the transition assembly of FIG. 1 with the cover removed and a portion of the power conductors removed for clarity.
Figure 4:
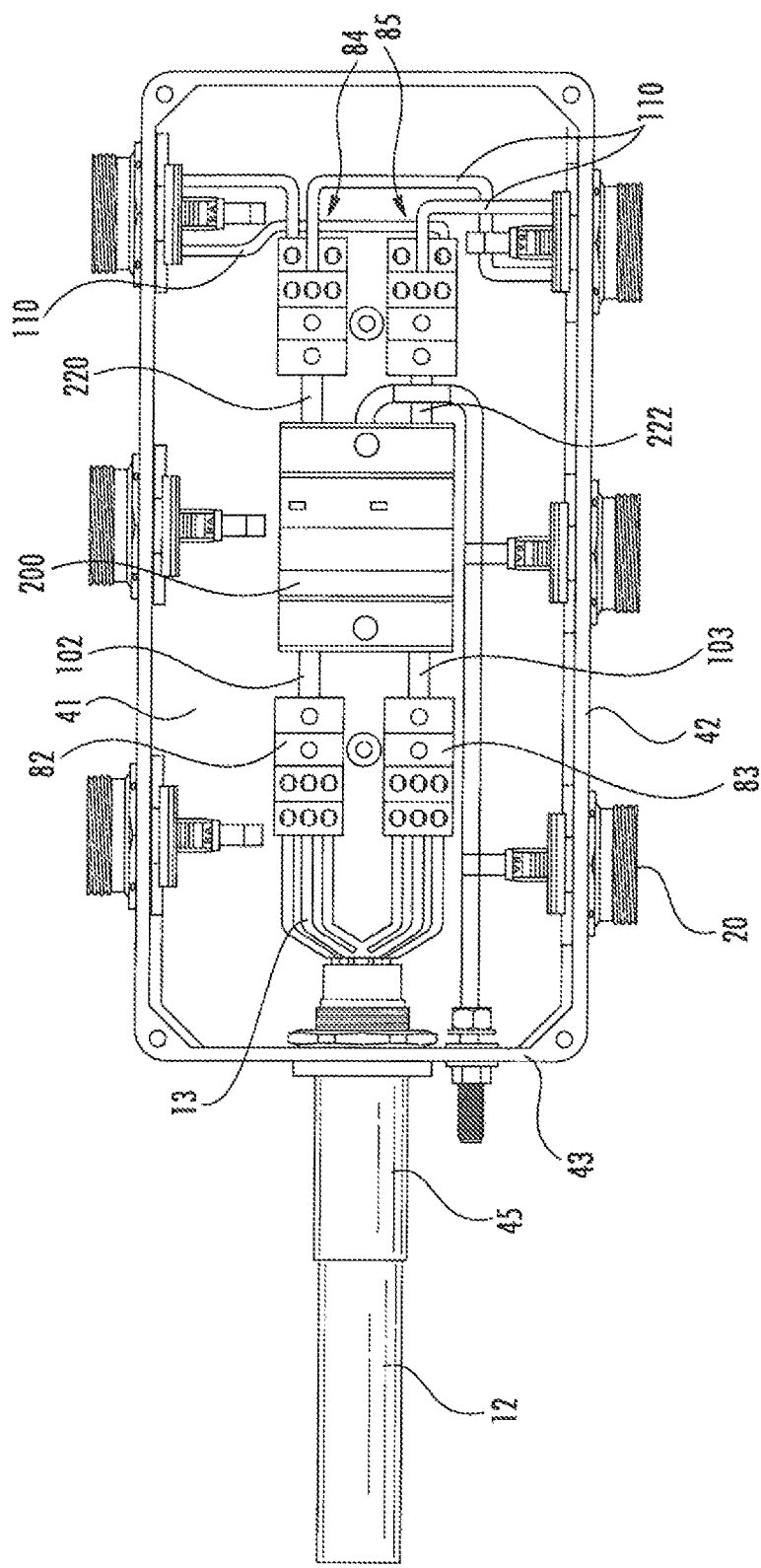
FIG. 4 is a top view of the transition assembly of FIG. 1 with the cover removed.
Figure 9:
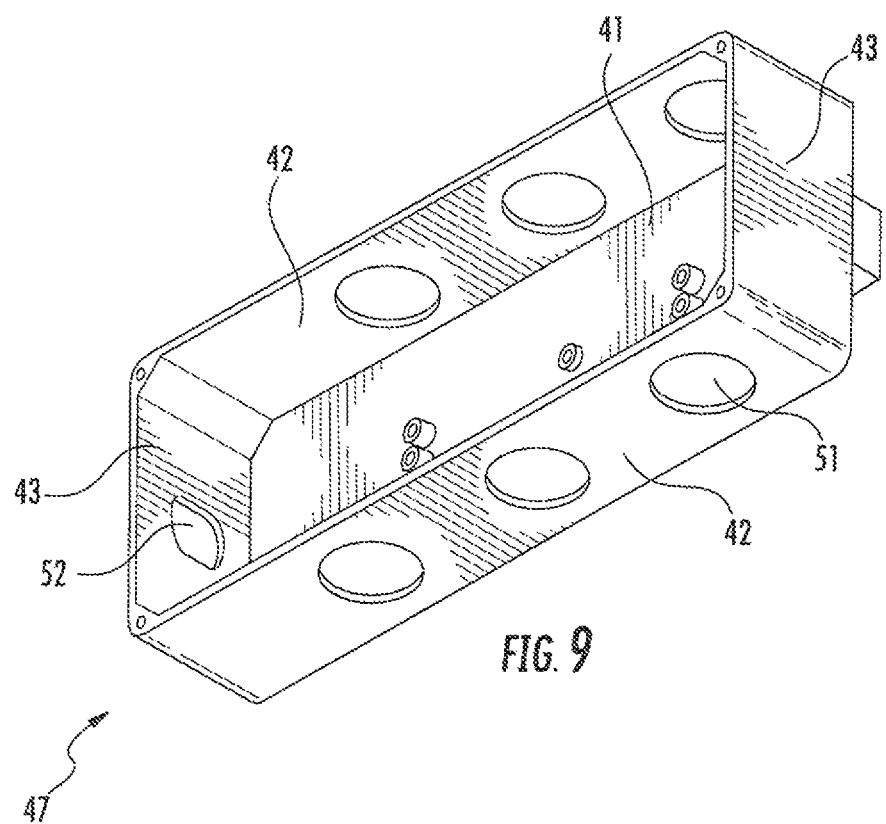
FIG. 9 is a top perspective view of the housing of the transition assembly of FIG. 1.
Figure 10:
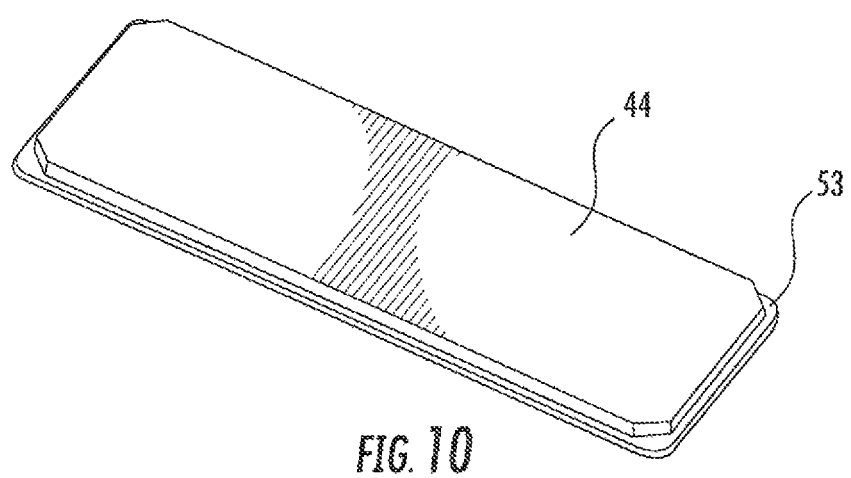
FIG. 10 is a bottom perspective view of the cover of the transition assembly of FIG. 1.

Referring now to FIGS. 3-5, the interior cavity 46 of the enclosure 40 hosts an OVP module 70. The OVP module 70 includes an OVP unit 200 mounted to the floor 41 with two holes at one end and two holes at the opposite end (the holes are not shown in FIGS. 3 and 4). The OVP unit 200, which is configured to create an open electrical circuit when experiencing a voltage higher than a predetermined threshold, can take a conventional form known to those of skill in this art and need not be described in detail herein. An exemplary unit is the VAL-MS-T1/T2 48/12.5 ST SPD (Surge Protection Device), available from Phoenix Contact.

Two stairstep entry contacts 82, 83 are mounted to the floor 41 between the OVP unit 100 and the end wall 43 through which the hybrid trunk cable 12 enters. Similarly, two stairstep exit contacts 84, 85 are mounted to the floor between the OVP unit 209 and the opposite end wall 43. Each of the stairstep contacts 82-85 essentially identical; thus, the discussion below with respect to the stairstep contact 82 is equally applicable to the other stairstep contacts 83-85. It should be noted that the stairstep contacts 82, 83 are in electrical isolation from each other, as are the stairstep contacts 84, 85.

The stairstep contact 82 has a stepped base 86 with two lower surfaces 87, 88 and two upper surfaces 89, 90 atop respective steps 91, 92. The lower surface 87 shares an edge with an end face 93 with three receptacles 94. Each of three holes 95 in the lower surface 87 communicates with a corresponding receptacle 94. A face 96 shares an edge with the upper surface 89 and has three receptacles 97; three holes 98 communicate with the receptacles 97. The lower surface 88 has a hole 99 that communicates with a receptacle 100 in an end face 105 that shares an edge with the upper surface 90.

Figure 13:
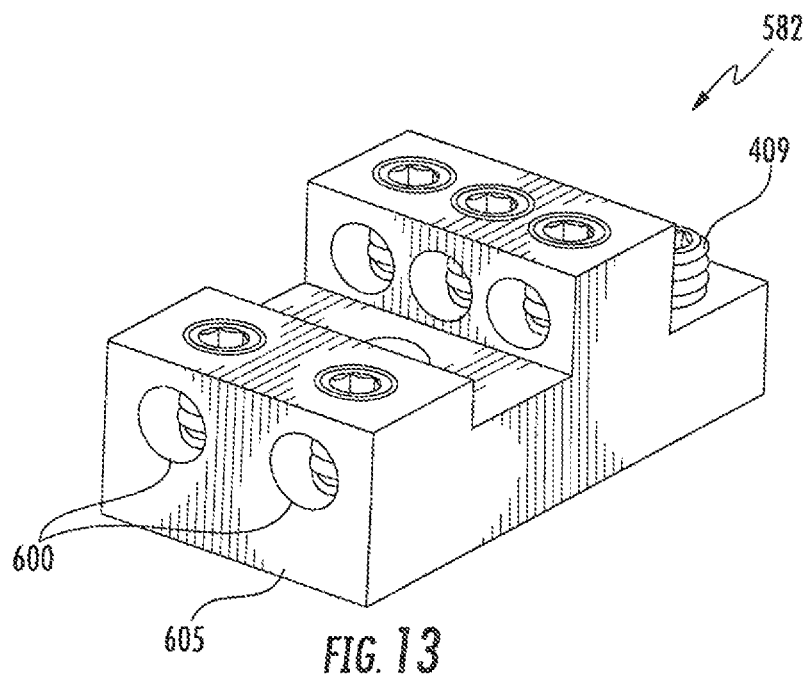
FIG. 13 is a top perspective view of a stairstep contact of the transition assembly of FIG. 11.

As can be seen in FIGS. 3 and 4, the power conductors 13 of the hybrid trunk cable 12 enter the enclosure through the sleeve 45 mounted in the end wall 43 of the transition enclosure 40. Each of the power conductors 13 is routed to a respective receptacle 94, 97 of one of the stairstep contacts 82, 83. Screws are inserted into the holes 95, 98 to secure the power conductors 13 in place (an exemplary screw is shown in FIG. 13 at 409). A conductor 102 is routed from the receptacle 99 of the contact 82 to one of the holes 202 in the OVP unit 200, and another conductor 103 is routed from the receptacle 99 of the contact 83 to the other of the holes 202 in the OVP unit 200; the conductors 102, 103 are secured in place with screws inserted into the holes 98.

At the opposite end of the OVP unit 200, a conductor 220 is inserted into one of the holes 204 and is routed to the receptacle 100 of the stairstep contact 84, where it is secured with a screw inserted into the hole 99. A second conductor 222 is inserted into the other of the holes 204 and is routed to the receptacle 100 of the stairstep contact 85, where it is secured with another screw inserted into the hole 99.

Three power conductors 110 are inserted into the receptacles 97 of each of the contacts 84, 85 and three additional power conductors 110 are inserted into the receptacles 94 of each of the contacts 84, 85 (only four of the twelve power conductors 110 are shown herein). Screws secure the power conductors 110 into place. Two power conductors 110 are then routed to each of the hybrid connectors 20 to supply power thereto, with one power conductor 110 being routed to each connector 20 from each of the contacts 84, 85.

It can be seen that power signals travelling on the twelve power conductors 13 reach the stairstep contacts 82, 83, where they are combined into two signals (one each for stairstep contacts 82 and 83). As noted above, the stairstep contacts 82, 83 are electrically isolated from each other. These two combined signals are routed from their respective contacts 82, 83 to the conductors 102, 103, in which they travel to the OVP unit 200. The signals exit the OVP unit 200 and travel through the conductors 220, 222 to the stairstep contacts 84, 85 (which, as noted, above, are electrically isolated from each other), where they are separated as they are routed to the power conductors 110 and subsequently to the hybrid connectors 20. Hybrid jumper cables can be attached to the connectors 20 for subsequent attachment to RRUs or other tower-top equipment. Thus, it can be seen that the same number of electrical power signals that enter the transition enclosure 40 also exit the transition enclosure 40, but are combined into two signals for routing through the OVP module 70 in order to simplify the overall design.

In normal operation, the power signals are routed as discussed above. In the event of a voltage surge (for example, caused by a lightning strike), the OVP unit 70 is configured to create an open circuit, with the result that the electronic components (such as the RRU and the antenna) are protected from the voltage surge.

Figure 11:
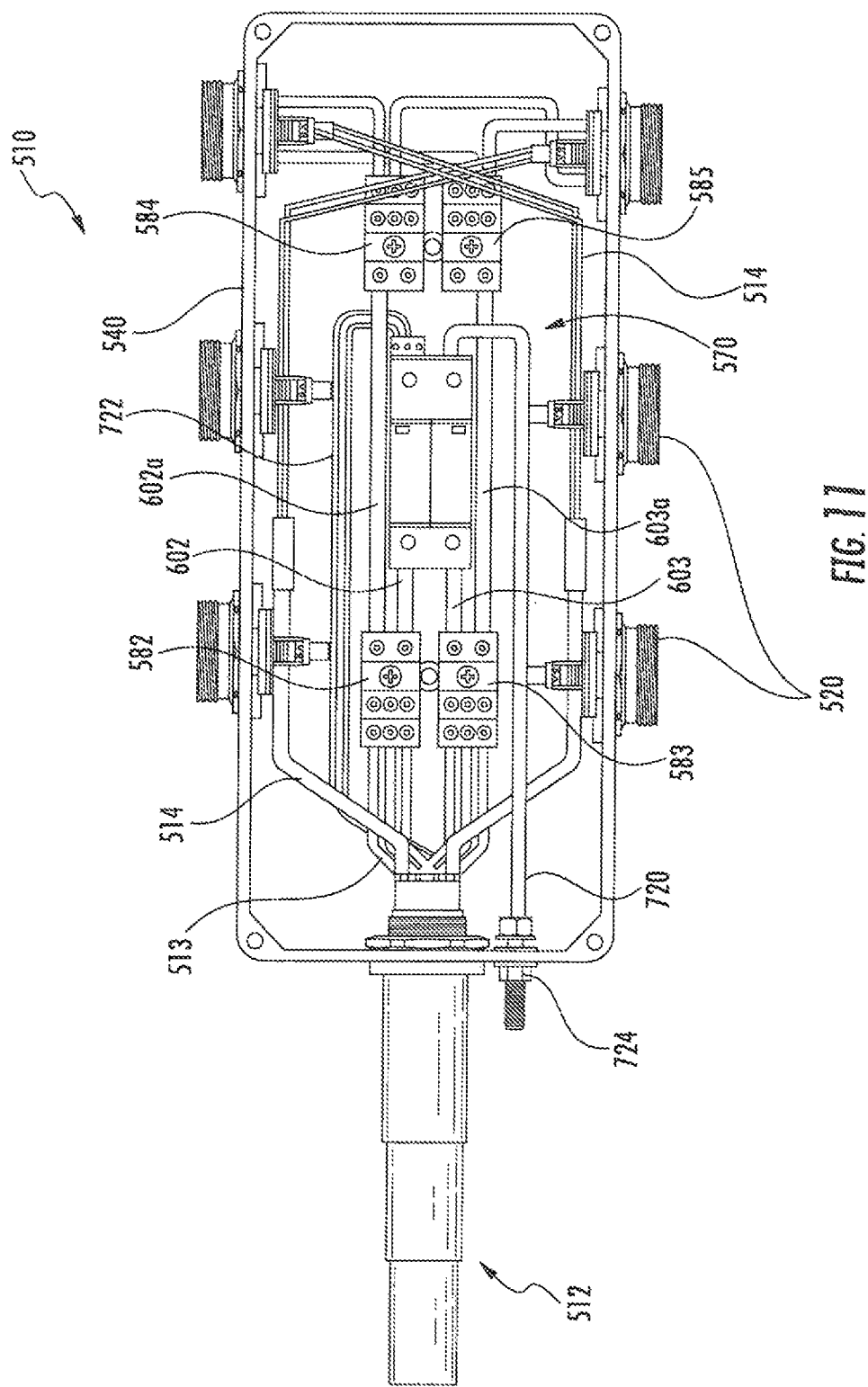
FIG. 11 is a top view of a transition assembly according to alternative embodiments of the invention with the cover removed.

It will also be understood that the optical fibers of the hybrid cable 12 will be connected with the connectors 20 (as shown by the fibers 514 in FIG. 11). In some embodiments, the optical fibers are "passed through" directly to the connectors 20 (this can be seen in connection with the embodiment discussed below with respect to FIGS. 11-13); in other embodiments, the optical fibers are spliced via conventional means (such as a splice tray) to additional optical fibers that are routed from the splice sites to the connectors 20.

Figure 16:
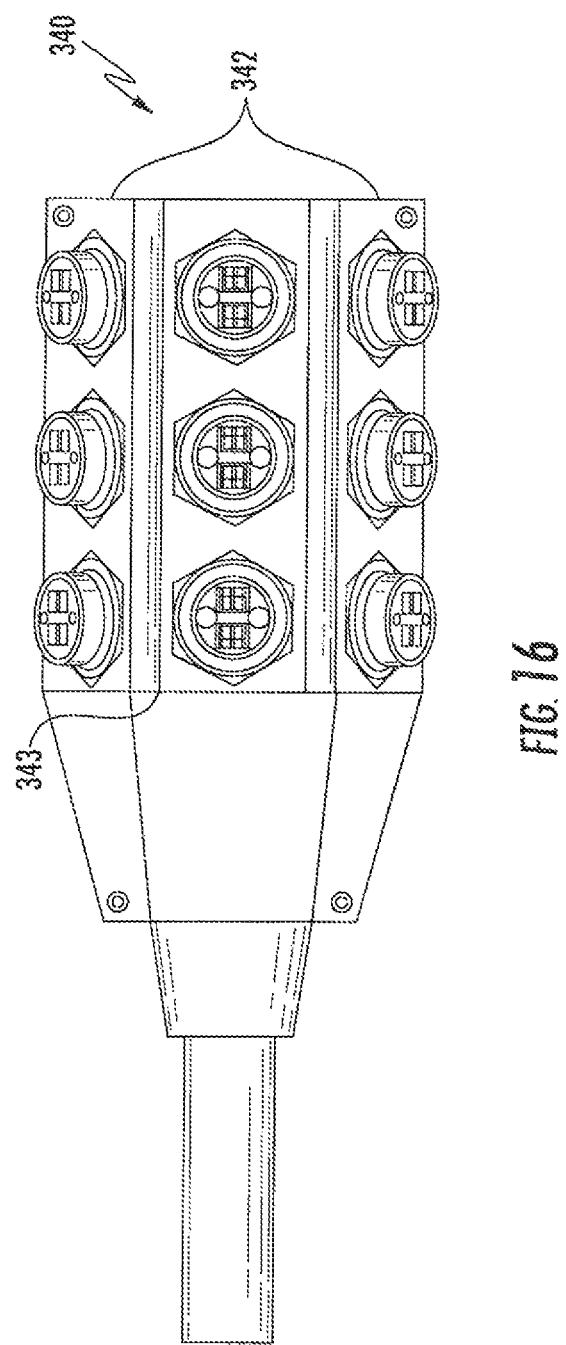
FIG. 16 is a top view of a transition assembly according to still further embodiments of the invention.

Those skilled in this art will appreciate that the transition assembly 10 may take other forms. For example, the transition enclosure 40 may take a different shape. Referring to FIG. 16, a transition enclosure 340 has two side walls 342 that angle inwardly to meet a ceiling 343 with the result that the transition enclosure 340 is generally trapezoidal in cross-section. Another embodiment may have two side walls that angle inwardly and merge, such that the transition enclosure is generally triangular in cross-section. Other configurations may be suitable also. Also, the transition enclosure 340 has an integrated nozzle that receives the trunk cable, whereas the sleeve 45 shown in FIG. 4 is a separate piece that can be sized differently to serve different sizes of trunk cable.

Further, the entry of the hybrid cable into the transition enclosure may vary. For example, the hybrid cable may be terminated with a connector, and the enclosure may include a mating connector, in which case the cable may be detachable and assembled to the enclosure in the field. In some embodiments, the hybrid cable may be divided into fiber optic and power subunits prior to entering the transition enclosure. Other variations in addition to those discussed above may be suitable fir use herein.

In addition, the connectors of the transition enclosure 40 may differ from the hybrid connectors shown herein. In some embodiments, the assembly 10 may include separate power and fiber optic connectors. Also, all of the connectors may be located on a single wall of the enclosure (which may be a side or end wall), or in the instance of separate power and fiber optic connectors, the power connectors may be located on one wall and the fiber optic connectors located on another wall.

Moreover, the stairstep contacts may take a different shape. For example, they may be configured as one long rectangular body with holes. The contacts may be positioned parallel to the long axis, in which case the hybrid cable may be routed installed or from the top with screws.

In some embodiments, the interior cavity 46 of the transition, housing 40 may be at least partially filled with a potting compound, such as an epoxy, to maintain environmentally sealed conditions.

Figure 12:
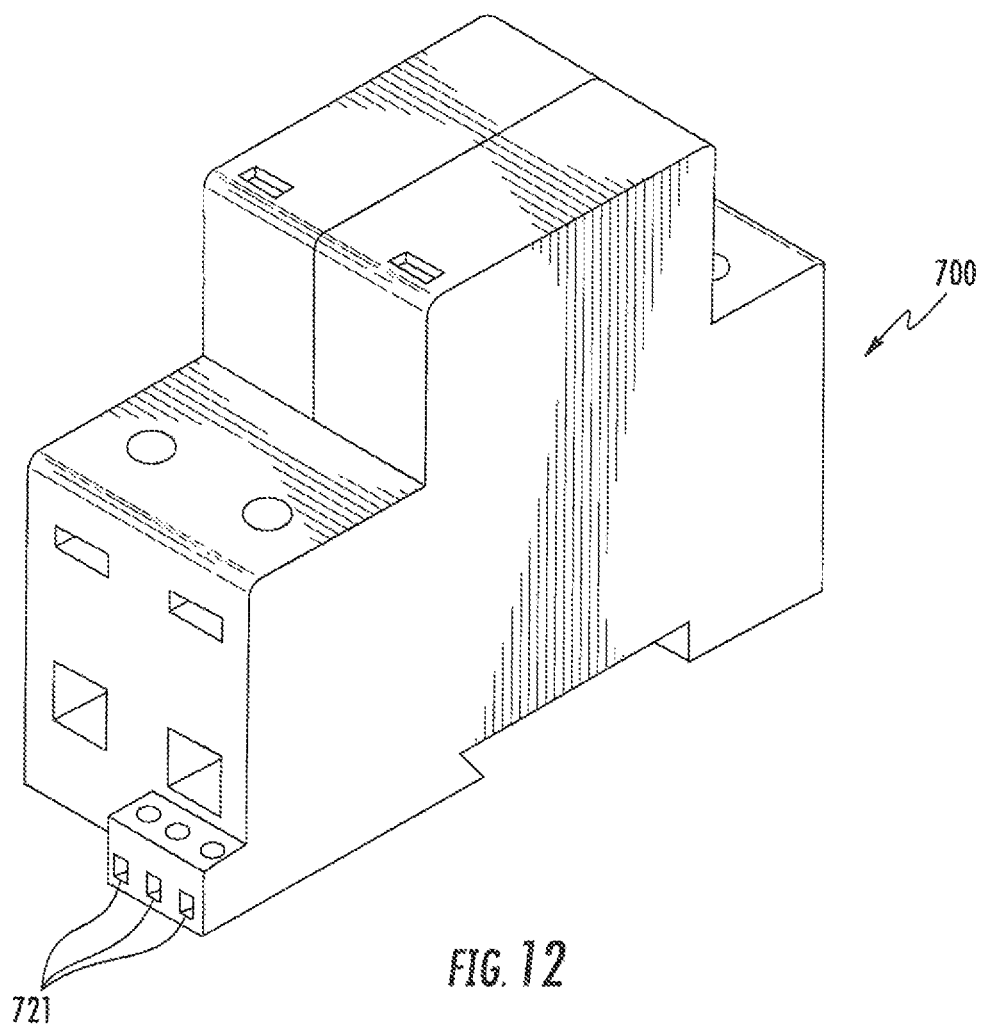
FIG. 12 is a top perspective view of an OVP module of the transition assembly of FIG. 11.

Referring now to FIGS. 11-13, an embodiment of a transition assembly, designated broadly at 510, is shown therein. As can be seen in FIG. 11, the transition assembly 510 includes an enclosure 540, a hybrid trunk cable 512, and hybrid connectors 520 as are described above. However, the OVP module 570 differs somewhat from the OVP module 70, as discussed below.

Referring first to FIG. 13, an exemplary stairstep contact 582 is shown there (the other stairstep contacts 583-585 are identical). The stairstep contact 582 is similar to the stairstep contacts 82-85 described above, but has two receptacles 600 on its end face 605 rather than a single receptacle. As shown in FIG. 12, an OVP unit 700 is similar to the OVP unit 200 with the exception that the OVP unit 700 has three small contact holes 721 on one end in addition to the aforementioned single hole.

Referring now to FIG. 11, it can be seen that conductors 513 are routed from the hybrid trunk cable 512 to the stairstep contacts 582 and 583 as discussed above with respect to the transition assembly 10. In addition, conductors 602, 603 are routed from holes in the stairstep contacts 582, 583 to the OVP unit 700. However, an additional conductor 602a, 603a is routed from each of the stairstep contacts 582, 583 directly to a respective stairstep contact 584, 585 without passing through the OVP unit 700. A conductor 610 is routed to each connector 520 from the contact 584 and a second conductor 610 is routed to each connector 520 from the contact 585. In addition, a conductor 720 is routed from the OVP unit 700 to a ground connection 724 mounted to the end wall 543, and two smaller conductors 722 are routed from the small contact holes 721 to an alarm (not shown).

In normal operation, power signals are routed between the stairstep contacts 582-585 through the conductors 602, 602a, 603, 603a. In the event of a voltage surge, however, the electrical path represented by the conductor 720 to the ground connection 724 represents the path of lowest resistance, and therefore enables the OVP unit 700 to protect the electronics connected to the transition assembly 510. However, in contrast to the transition assembly 10, which is disabled from activity in the event of a voltage surge and therefore must be replaced before communications with attached RRUs can be restored, the transition assembly 510 can continue to provide signals to attached equipment (although without OVP capability) until the transition assembly 510 can be replaced with another unit with OVP capability.

Also, the presence of the conductors 724 can activate the attached alarm, which can signal a technician that the transition assembly 510 should be replaced.

Figure 15:
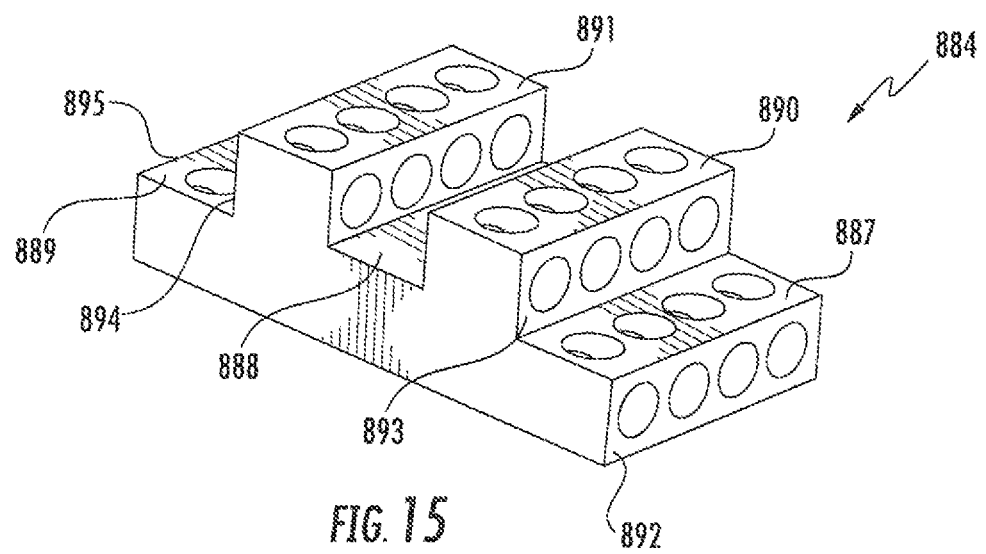
FIG. 15 is a perspective view of a stairstep contact of the transition assembly of FIG. 14.
Figure 14:
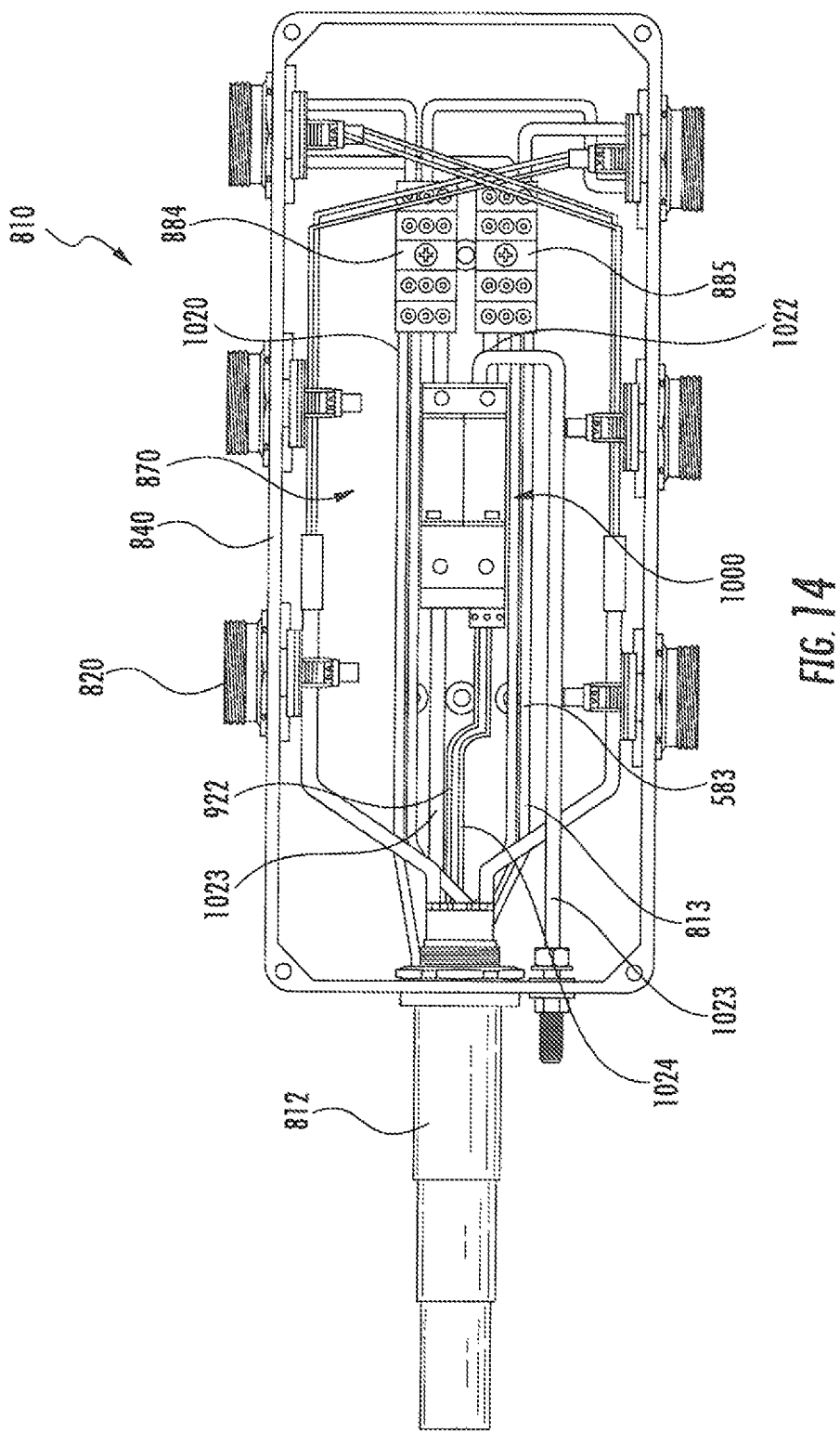
FIG. 14 is a top view of a transition assembly according to further embodiments of the invention.

Referring now to FIGS. 14 and 15, another embodiment of a transition assembly, designated broadly at 810, is shown therein. The transition assembly 810 includes an enclosure 840, a hybrid trunk cable 812, and hybrid connectors 820 as are described above. However, the OVP module 870 differs somewhat from the OVP module 70, as discussed below.

As can be seen in FIG. 14, the OVP module 870 includes only two stairstep contacts 884, 885, each of which includes an additional "step." Also, the OVP unit 1000 is similar to the OVP unit 700, but is oriented 180 differently, such that the smaller contact holes for the alarm conductors 922 face the hybrid trunk cable 812. As shown in FIG. 15, the stairstep contacts 884, 885 have three lower surfaces 887, 888, 889 and two upper surfaces 890, 891, with four faces 892, 893, 894, 895 with receptacles 896 for conductors.

As can be seen in FIG. 14, the conductors 813 of the hybrid trunk cable 812 are routed directly to respective stairstep contacts 884, 885. A respective conductor 1020, 1022 is routed from each stairstep contact 884, 885 to the OVP unit 1000. A conductor 1023 is routed from the OVP unit 1000 to ground, and two small conductors 1024 are routed from the OVP unit 1000 to an alarm.

Like the transition assembly 510, the transition assembly 810 can provide protection against a voltage surge, but can do so with fewer stairstep contacts.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A transition assembly for interconnecting a hybrid trunk cable and electronic equipment, comprising:
    an enclosure having first and second ends, first and second side walls, and a cavity;
    a hybrid trunk cable comprising first and second sets of pluralities of power conductors and a plurality of optical fibers, wherein the first and second sets of power conductors enter the enclosure at the first end;
    a plurality of connectors mounted to at least one of the first and second side walls; and
    an overvoltage protection (OVP) module comprising:
    an OVP unit mounted in the enclosure and configured to create an open electrical circuit when experiencing a voltage higher than a predetermined threshold;
    a first contact mounted in the enclosure and connected with the first set of power conductors;
    a second contact mounted in the enclosure in electrical isolation from the first contact, the second contact connected with the second set of power conductors;
    a first OVP conductor connected between the first contact and the OVP unit;
    a second OVP conductor connected between the second contact and the OVP unit;
    a third contact mounted in the enclosure and connected with the connectors;
    a fourth contact mounted in the enclosure in electrical isolation from the third contact, the fourth contact connected with the connectors;
    a third OVP conductor connected between the OVP unit and the third contact; and
    a fourth OVP conductor connected between the OVP unit and the fourth contact.

2. The transition assembly defined in claim 1, wherein the connectors are hybrid connectors.

3. The transition assembly defined in claim 1, wherein the side walls are opposed side walls.

4. The transition assembly defined in claim 1, wherein the enclosure is generally rectangular in profile.

5. The transition assembly defined in claim 1, wherein the enclosure is generally triangular in profile.

6. The transition assembly defined in claim 1, wherein at least one of the first and second contacts is a stairstepped contact.

7. The transition assembly defined in claim 1, wherein the first and second sets of connectors are connected with hybrid jumper cables.

8. The transition assembly defined in claim 7, wherein each of the hybrid jumper cables is connected with an RRU.

9. The transition assembly defined in claim 1, wherein the hybrid trunk cable is detachable from the enclosure.

10. A transition assembly for interconnecting a hybrid trunk cable and electronic equipment, comprising:
    an enclosure having first and second ends, first and second side walls, and a cavity;
    a hybrid trunk cable comprising first and second sets of pluralities of power conductors and a plurality of optical fibers, wherein the first and second sets of power conductors enter the enclosure at the first end;

a plurality of connectors mounted to at least one of the first and second side walls; and an overvoltage protection (OVP) module comprising:

an OVP unit mounted in the enclosure and configured to create an open electrical circuit when experiencing a voltage higher than a predetermined threshold;

a first contact mounted in the enclosure and connected with the first set of power conductors;

a second contact mounted in the enclosure in electrical isolation from the first contact, the second contact connected with the second set of power conductors;

a first OVP conductor connected between the first contact and the OVP unit;

a second OVP conductor connected between the second contact and the OVP unit;

a third contact mounted in the enclosure and connected with the connectors;

a fourth contact mounted in the enclosure in electrical isolation from the third contact, the fourth contact connected with the connectors;

a third OVP conductor connected between the OVP unit and the third contact;

a fourth OVP conductor connected between the OVP unit and the fourth contact;

a first direct conductor extending between the first and third contacts; and a second direct conductor extending between the second and fourth contacts.

11. The transition assembly defined in claim 10, further comprising a ground contact routed between the OVP unit and ground.

12. The transition assembly defined in claim 10, wherein two small contacts are routed between the OVP unit and an alarm.

13. The transition assembly defined in claim 10, wherein the connectors are hybrid connectors.

14. The transition assembly defined in claim 10, wherein at least one of the first and second contacts is a stairstepped contact.

15. A transition assembly for interconnecting a hybrid trunk cable and electronic equipment, comprising:

an enclosure having first and second ends, first and second side walls, and a cavity;

a hybrid trunk cable comprising first and second sets of pluralities of power conductors and a plurality of optical fibers, wherein the first and second sets of power conductors enter the enclosure at the first end;

a plurality of connectors mounted to at least one of the first and second side walls; and an overvoltage protection (OVP) module comprising:

an OVP unit mounted in the enclosure and configured to create an open electrical circuit when experiencing a voltage higher than a predetermined threshold;

a first contact mounted in the enclosure and connected with the first set of power conductors and with the connectors;

a second contact mounted in the enclosure in electrical isolation from the first contact, the second contact connected with the second set of power conductors and with the connectors;

a first OVP conductor connected between the first contact and the OVP unit;

a second OVP conductor connected between the second contact and the OVP unit.

16. The transition assembly defined in claim 15, further comprising a ground contact routed between the OVP unit and ground.

17. The transition assembly defined in claim 15, wherein two small contacts are routed between the OVP unit and an alarm.

18. The transition assembly defined in claim 15, wherein the connectors are hybrid connectors.

19. The transition assembly defined in claim 15, wherein at least one of the first and second contacts is a stairstepped contact.

* * * * *